(12) United States Patent
Kandasamy et al.

(10) Patent No.: US 11,102,679 B2
(45) Date of Patent: Aug. 24, 2021

(54) SIMPLE COMMUNICATION PROTOCOL FOR DATA TRANSMISSION OVER CONSTRAINED NETWORKS

(71) Applicant: ACKLIO, Cesson-Sévigné (FR)

(72) Inventors: Arunprabhu Kandasamy, Cesson-Sevigne (FR); Ana Minaburo, Cesson-Sevigne (FR)

(73) Assignee: ACKLIO, Cesson-Sevigne (FR)

( * ) Notice: Subject to any disclaimer, the term of this patent is extended or adjusted under 35 U.S.C. 154(b) by 24 days.

(21) Appl. No.: 16/659,456

(22) Filed: Oct. 21, 2019

(65) Prior Publication Data
US 2020/0137628 A1    Apr. 30, 2020

(30) Foreign Application Priority Data

Oct. 24, 2018 (EP) .................................. 18306387

(51) Int. Cl.
*H04W 28/06* (2009.01)
*H04L 29/06* (2006.01)
(Continued)

(52) U.S. Cl.
CPC ........... *H04W 28/065* (2013.01); *H04L 69/04* (2013.01); *H04W 88/182* (2013.01); *H04W 80/06* (2013.01)

(58) Field of Classification Search
CPC . H04W 28/065; H04W 88/182; H04W 80/06; H04W 28/06; H04L 69/04; H04L 29/06102; H04L 29/0651; H04L 29/0653
See application file for complete search history.

(56) References Cited

U.S. PATENT DOCUMENTS

| 10,652,220 B1* | 5/2020 | Ramanujan ......... H04L 63/0478 |
| 2002/0071436 A1* | 6/2002 | Border .................. H04L 47/193 370/395.32 |

(Continued)

FOREIGN PATENT DOCUMENTS

WO   2011/114183 A1   9/2011

OTHER PUBLICATIONS

Minaburo, et al., "LPWAN Static Context Header Compression (SCHC) for IPv6 and UDP draft-ietf-lpwan-ipv6-static-context-hc-00", Ipwan Working Group, Dec. 5, 2016.
(Continued)

*Primary Examiner* — Kibrom T Hailu
(74) *Attorney, Agent, or Firm* — BakerHostetler

(57) ABSTRACT

A source proxy for transmitting one or more TCP packets sent from a source device to a destination device over a wireless link is provided. Each TCP packet comprises a TCP data section and a TCP packet header. The source proxy is located on the wireless link and is configured to: receive the one or more TCP packets; determine a simple compression mode packet from the one or more TCP packets by removing the TCP packet header comprised in each TCP packet, the simple compression mode packet comprising the TCP data sections comprised in the one or more TCP packets and a header that comprises a connection identifier, and send the simple compression mode packet to a destination proxy located on the wireless link, the destination proxy being configured to: receive the simple compression mode packet and acknowledge reception to the source proxy; determine one or more reconstructed TCP packets by extracting the data sections of each TCP packet from the simple compression mode packet, and send the one or more reconstructed TCP packets to the destination device.

14 Claims, 8 Drawing Sheets

(51) Int. Cl.
H04W 88/18 (2009.01)
H04W 80/06 (2009.01)

(56) References Cited

U.S. PATENT DOCUMENTS

| | | | | |
|---|---|---|---|---|
| 2006/0126663 A1* | 6/2006 | Teng | ................ | H04L 65/607 |
| | | | | 370/469 |
| 2008/0267217 A1* | 10/2008 | Colville | ................ | H04L 69/04 |
| | | | | 370/477 |
| 2009/0190612 A1* | 7/2009 | Bae | ................ | H04L 69/04 |
| | | | | 370/477 |
| 2013/0254365 A1* | 9/2013 | Gupta | ................ | H04L 45/22 |
| | | | | 709/223 |
| 2015/0133120 A1* | 5/2015 | Yang | ................ | H04W 36/023 |
| | | | | 455/436 |
| 2016/0360013 A1* | 12/2016 | Li | ................ | H04L 12/4633 |
| 2020/0022022 A1* | 1/2020 | Ly | ................ | H04W 28/06 |
| 2020/0304604 A1* | 9/2020 | Zhao | ................ | H04L 69/16 |

OTHER PUBLICATIONS

Minaburo, et al., "6LPWA Static Context Header Compression (SCHC) for CoAP draft-ietf-lpwan-coap-static-context-hc-00", lpwan Working Group, Dec. 5, 2016.
Farrell, "Low-Power Wide Area Network (LPWAN) Overview", Internet Engineering Task Force (IETF), May 2018.

* cited by examiner

SIMPLE COMMUNICATION PROTOCOL FOR DATA TRANSMISSION OVER CONSTRAINED NETWORKS

CROSS-REFERENCE TO RELATED APPLICATIONS

This application claims priority to foreign European patent application No. EP 18306387.4, filed on Oct. 24, 2018, the disclosure of which is incorporated by reference in its entirety.

FIELD OF THE INVENTION

The invention generally relates to data transmission over TCP/IP networks and more specifically to the transmission of TCP data over wireless networks.

BACKGROUND

Machine-To-Machine (M2M), Web-of-Things (WoT), and Internet of Things (IoT) have enabled development of networks of physical devices, machines, vehicles, home alliances and many other objects connected to each other and provided with a connectivity to the Internet and the ability to collect and exchange data without requiring human-to-human or human-to-computer interactions.

Several wired and wireless communication protocols and technologies offer connectivity to IoT/M2M entities (e.g. IoT/M2M devices and gateways) comprising:

wired networks (e.g. Ethernet, Multimedia over Coax Alliance (MoCA), Power-line communication);

short range wireless networks (e.g. Bluetooth mesh networking, Light-Fidelity, Wi-Fi, and Near-Field communications);

medium range wireless networks (e.g. HaLow, LTE-advanced), and low-range wireless networks (e.g. Low-Power Wide Area Networks (LPWAN), Very small aperture terminal, and long-range Wi-Fi connectivity).

LPWANs are wireless networks designed to allow long-range communications at a low data rate, reducing power and cost for transmission. LPWANs are constrained networks that have challenging constraints to offer connectivity to constrained devices, such as IoT devices, that require low bandwidth, low power consumption, and low data rates. Exemplary LPWAN technologies comprise LoRaWAN (Long Range Radio Wide Area Network), Sigfox, LTE-NB1 (Long Term Evolution-Machine to Machine, Narrow Band), NB-IoT (NarrowBand IoT), and Weightless. Details on these technologies are disclosed for example in "RFCB376".

IoT entities use the Internet to connect between one another and may interact on multiple communication protocol layers such as the network layer and the application protocol layer in accordance with various protocol standards and conventions. IoT protocol stack supports the Internet Protocol (IP), the User Datagram Protocol (UDP), and Constrained Application Protocol (CoAP). Initially, IPv4 Internet protocol was used to allocate a unique IP address to each IoT entity/object as a unique identifier. Due to the limited address space of IPv4 and to the large address space required to cover the increasing number of IoT objects, the IPv6 has been adopted.

Adopting the IPv6, UDP, and CoAP protocols for connecting objects over constrained very low bandwidth networks such as the LPWANs can offer cost-effective connectivity and data collection and transfer for many IoT applications. The challenge of supporting the IPv6/UDP/CoAP protocols in such constrained networks is the limited frame size of these networks compared with the large protocol header overhead of the IPv6, the UDP, and the CoAP protocols (e.g. 40 octets for IPv6 header, 8 octets for the UDP header, and more than 4 octets for the CoAP header against only one or two octets of frame size that may be available to transmit all headers of IPv6/UDP/CoAP protocols). The adaptation of the IPv6/UDP/CoAP over LPWANs to meet such challenge has been addressed by the IETF (Internet Engineering Task Force) LPWAN working group since 2016.

Initial works of the IETF group focus on protocol header compression and fragmentation/reassembly as a solution to economize network bandwidth consumption and to adapt the size of the IPv6, IPv6/UDP, or IPv6/UDP/CoAP protocol headers to the limited frame size of the Layer 2 of LPWANs. Header compression enables removing redundant information and unused fields. The works disclosed in "draft-ietf-Ipwan-ipv6-static-context-hc-00" and "draft-ietf-Ipwan-coap-static-context-hc-00" proposed by the IETF working group define a new Static Context Header Compression (SCHC) scheme applicable for the compression of the IPv6 protocol header, the UDP protocol header, and the CoAP protocol header, independently on the used LPWAN technology.

SCHC relies on building a static context shared between the network components to compress/decompress the protocols headers. A context is a set of rules used to compress/decompress headers. A rule is a set of header field values identified by a rule identifier (rule ID). The context is static, meaning that the content of the context, i.e. the values of the header fields do not change with time. Such property enables avoiding complex synchronization, which is the most resource consuming operation during header compression. A shared context is accordingly stored on devices within the LPWAN that store the same rule ID to compress/decompress a specific traffic flow.

FIG. 1 represents the architecture of an exemplary LPWAN comprising two devices, device 1 and device 2, each of them running applications that produce/accept IPv6/UDP/CoAP flows sent/received to/from an applications server over the LPWAN. Bidirectional communications between the two devices and the applications server is shown. Data is transferred over the Radio Gateway 103 and the Network Gateway 105. The produced/received flows are compressed/decompressed while transferred over the LPWAN. Accordingly, each of device 1 and device 2 is equipped with a compression/decompression unit 101 referred to SCHC C/D and a network SCHC C/D 107 is integrated in the LPWAN, each of the compression/decompression unit 101 and the network SCHC C/D 107 being configured to perform compression/decompression actions depending on the directed flow. For example for uplink communications corresponding to transferring data from the device 1 or the device 2 to the applications server, each compression/decompression unit 101 is configured to compress at least one of the headers of the IPv6/UDP/CoAP packets to reduce the headers size. The obtained frame is sent on a layer 2 frame to the radio gateway 103 of the LPWAN. Data is then transferred from the radio gateway 103 to the network gateway 105. The network gateway 105 then sends the data to the network SCHC C/D 107 for decompression. The network gateway 105 shares the same rules with device 1 and device 2. The decompressed packet is then sent to the applications server over Internet network (e.g. using an IP Ethernet link). The network SCHC C/D 107 can be part of the network gateway 105 or can be located outside the network gateway 105 if a tunnel between the network gateway 105 and the network SCHC C/D 107 is established. For downlink communications, the principle is the same except that the network SCHC C/D 107 performs header compression and the respective compression/decompression unit 101 implemented on the device 1 and device 2 performs decompression operations.

FIG. 2 shows the static context according to SCHC compression/decompression. The context comprises a set of N rules denoted by Rule 1, Rule 2, . . . , Rule N. A rule is used for the compression of one or more protocol headers, e.g. a rule may be used for the IPv6 protocol header, the IPv6/UDP/CoAP protocols headers, or IPv6/ICMP headers. Each rule comprises a set of N header fields and is defined using a rule ID. A header field (also referred to 'a field') corresponds to a segment in the header to be compressed/decompressed and describes the action performed to compress/decompress this field. A field comprised in a given rule contains:

a field identifier (field ID): a unique value defining the field; a target value (TV): a value compared with the packet header field value; a matching operator (MO): an operator used to make the comparison between the target value and the packet header field value, and a compression/decompression (C/D) function (CDF): used to describe the process of compression/decompression of the field.

The SCHC compression/decompression scheme is based on sending the rule ID instead of known field values between the different compression/decompression entities of the LPWAN. The SCHC compression/decompression process consists of several steps. First, a compression rule is selected. To achieve rule selection, the header field value is compared to the target value stored in the rule for that field using the matching operator. If all the fields of the packet's header match one of the rules of the context, i.e. satisfy all the matching operators of a rule, this rule is selected and the compressor uses the C/D functions of the selected rule to compress the packet header(s) and sends the rule ID to the decompressor. When receiving the compressed packet, a decompression unit identifies the used rule using the received rule ID and performs decompression operations to the received packet to reconstruct the original packet by applying the corresponding C/D function.

The SCHC draft "draft-ietf-Ipwan-ipv6-static-context-hc-01" defines further fragmentation mechanisms applied after compression/decompression to fragment the obtained packet into multiple fragments in order to adapt the size of the compressed packet to the size of the LPWAN layer 2 data unit size if after applying header compression, the size of the packet is larger than the LPWAN layer 2 data unit maximum payload or if header compression was not performed.

Header compression and fragmentation are performed in an adaptation layer between the link layer and the network layer of the TCP/IP protocol stack, accordingly modified to fit IPv6 into constrained IoT networks. SCHC compression and fragmentation mechanisms developed for LPWANs do not deal with the compression of dynamic fields and is not applicable to protocols with headers that comprise dynamic fields, such as the headers of the TCP (Transmission Control Protocol).

At the transport layer, UDP is chosen as the transport layer protocol. Although the dominant transport protocol layer on the Internet is the TCP, constrained networks such as IoT networks may not support TCP and may not allow TCP traffic due mainly to the limited energy and bandwidth constraints of IoT devices/networks and to the high latency introduced by the TCP (e.g. when performing TCP handshaking, in-order delivery or retransmission mechanisms) that is not supported in applications with low-latency requirements.

There is accordingly a need for developing communication schemes and protocols enabling a support of TCP traffic over constrained networks such as IoT/M2M networks.

SUMMARY OF THE INVENTION

In accordance with the present invention, there is provided a source proxy for transmitting one or more TCP packets sent from a source device to a destination device over a wireless link. Each TCP packet comprises a TCP data section and a TCP packet header. The source proxy is located on the wireless link and is configured to:
receive the one or more TCP packets;
determine a simple compression mode packet from the one or more TCP packets by removing the TCP packet header comprised in each TCP packet, the simple compression mode packet comprising the TCP data sections comprised in the one or more TCP packets and a header that comprises a connection identifier, and
send the simple compression mode packet to a destination proxy located on the wireless link, the destination proxy being configured to:
receive the simple compression mode packet and acknowledge reception to the source proxy;
determine one or more reconstructed TCP packets by extracting the data sections of each TCP packet from the simple compression mode packet, and
send the one or more reconstructed TCP packets to the destination device.

According to some embodiments, the connection identifier identifies a connection between the source proxy and the destination proxy, a TCP packet header comprising an options field, the header of the simple compression mode packet further comprising:
a first next field representing a number of the simple compression mode packet sent by the source proxy and being incremented by one each time a simple compression mode packet is sent by the source proxy;
a second next field representing a number of the simple compression mode packet received by the source proxy from the destination proxy and being incremented by one each time a simple compression mode packet is sent from the destination proxy to the source proxy;
a third next field indicating if a connection end is delivered by the source or the destination;
a fourth next field indicating if the simple compression mode packet comprises one or multiple TCP data packets, and
a fifth next field indicating if the TCP options field is to be comprised in the simple compression mode packet.

According to some embodiments, the source proxy may be configured to send, to the destination proxy, a simple compression mode packet to acknowledge the received data through an empty TCP data and a third next field equal to a predefined end bit value if a connection end is delivered by the source device, the destination proxy being configured to send, to the source proxy a simple compression mode packet that comprises empty TCP data and a third next field equal to a predefined end bit value if a connection end is delivered by the destination device.

According to some embodiments, the source device may be configured to exchange TCP packets with the source proxy over a source TCP connection according to the TCP/IP protocol stack and the destination device may be configured to exchange TCP packets with the destination proxy over a destination TCP connection according to the TCP/IP protocol stack.

According to some embodiments, the source proxy may be further configured to encapsulate each simple compression mode packet into an IP datagram and to encapsulate the IP datagram into a simple compression mode frame, the source proxy and the destination proxy being configured to exchange simple compression mode frames over the wireless link and to acknowledge reception of each simple compression mode frame.

According to some embodiments, the source proxy and the destination proxy may be configured to fragment a simple compression mode frame into two or more fragments depending on a predefined frame size related to specifications of the wireless link.

According to some embodiments, the source proxy may be configured to perform header compression to the IP datagram, header compression applied to an IP datagram providing IP header residue and being associated with a rule identifier, a simple compression mode frame encapsulating the IP datagram further comprising the IP header compression residue and rule identifier, the destination proxy being configured to perform header decompression to the IP datagram encapsulated in each received simple compression mode frame sent by the source proxy according to said rule identifier and IP header compression residue.

According to some embodiments, the source device and the destination device may be further configured to use a constrained application protocol producing constrained application protocol messages comprised in each TCP packet, the source proxy being further configured to perform header compression to the header of each constrained protocol message, header compression providing header compression residue and being associated with a rule identifier, the simple compression mode frame determined from one or more TCP packets comprising constrained application protocol data further comprising the rule identifier and header compression residue, the destination proxy being further configured to perform header decompression to the header of each constrained protocol message comprised in each reconstructed TCP packet according to the header compression residue and rule identifier.

According to some embodiments, header compression and header decompression may be performed using a static context header compression protocol.

According to some embodiments, each rule identifier may be related to a connection identifier, the source proxy and the destination proxy being further configured to store a mapping table in which each rule identifier is mapped to a connection identifier.

According to some embodiments, the wireless link may be a low-power wide area network or a low-power short range wireless network, the source proxy and the destination proxy being located at gateway nodes in the low-power wide area network or the low-power short-range wireless network.

According to some embodiments, the low-power wide area network may use a technology chosen in a group comprising the LoRaWan, the Sigfox, the NB-IoT, IEEE.802.15.4, and Weightless.

There is also provided a method for transmitting, by a source proxy, one or more TCP packets sent from a source device to a destination device over a wireless link, each TCP packet comprising a TCP data section and a TCP packet header. The method comprises:

receiving the one or more TCP packets by a source proxy located on the wireless link;

determining, by said source proxy, a simple compression mode packet from the one or more TCP packets by removing the TCP packet header comprised in each TCP packet, the simple compression mode packet comprising the TCP data sections comprised in the one or more TCP packets and a header that comprises a connection identifier;

sending, by the source proxy, the simple compression mode packet to a destination proxy located on the wireless link;

receiving, by the destination proxy, the simple compression mode packet and acknowledging reception of the simple compression mode packet to the source proxy;

determining, by the destination proxy, one or more reconstructed TCP packets by extracting the data sections of each TCP packet from the simple compression mode packet, and sending, by the destination proxy, the one or more reconstructed TCP packets to the destination device.

There is also provided a program stored in a computer-readable non-transitory medium for transmitting, by a source proxy, one or more TCP packets sent from a source device to a destination device over a wireless link, each TCP packet comprising a TCP data section and a TCP packet header, the program comprising instructions stored on the computer-readable storage medium that, when executed by a processor, cause the processor to:

receive the one or more TCP packets by a source proxy located on the wireless link;

determine, by the source proxy, a simple compression mode packet from the one or more TCP packets by removing the TCP packet header comprised in each TCP packet, the simple compression mode packet comprising the TCP data sections comprised in the one or more TCP packets and a header that comprises a connection identifier;

send, by the source proxy, the simple compression mode packet to a destination proxy located on the wireless link;

receive, by the destination proxy, the simple compression mode packet and acknowledging reception of the simple compression mode packet to the source proxy;

determine, by the destination proxy, one or more reconstructed TCP packets by extracting the data sections of each TCP packet from the simple compression mode packet, and send, by the destination proxy, the one or more reconstructed TCP packets to the destination device.

Advantageously, the embodiments of the invention provide simplified transmission protocols that enable a support of TCP traffics over wireless networks.

Advantageously, the embodiments of the invention enable exchange of TCP data between nodes/entities connected via constrained networks limited in terms of power/data rates/bandwidth.

Advantageously, the embodiments of the invention provide simple communication protocols combining a simple compression mode protocol performed on TCP data and header compression/decompression mechanism applied to IP datagrams enabling a reduction of the amount of data transmitted over wireless networks.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, are provided for illustration purposes only and they illustrate various embodiments of the invention together with the general description of the invention given above, and the detailed description of the embodiments given below.

DETAILED DESCRIPTION

Embodiments of the invention provide systems and methods enabling the exchange of TCP traffic between a source node (also referred to as 'a source' or 'a source device') and a destination node (also referred to as 'a destination' or 'a destination device') connected over a wireless network, preferably a constrained network such as wireless IoT/M2M network representing low energy power-consumption/long battery life/low-latency/low hardware and operating cost/high connection density constraints such as low-power wide area networks and low-power short-range IoT networks.

The source refers to a TCP session initiator producing data that comprises TCP packets and the destination refers to the TCP session receiver to which is directed the data produced by the source. The source and the destination each may use a protocol stack enabling connection to IP-based networks (e.g. TCP/IP protocol stack) and has a valid IP address.

The embodiments of the invention may be implemented in any transmission or communication Internet-based networks that use Internet Protocol to exchange data. The source and the destination may be any devices/terminals that implement the TCP/IP protocol stack to connect via the Internet. The constrained network may be any wireless network of constrained devices requiring low bandwidth, low power consumption, or low data rates (e.g. low-power wide area networks and low-power short-range wireless networks). Examples of constrained networks comprise IoT and M2M networks.

Figure 1:
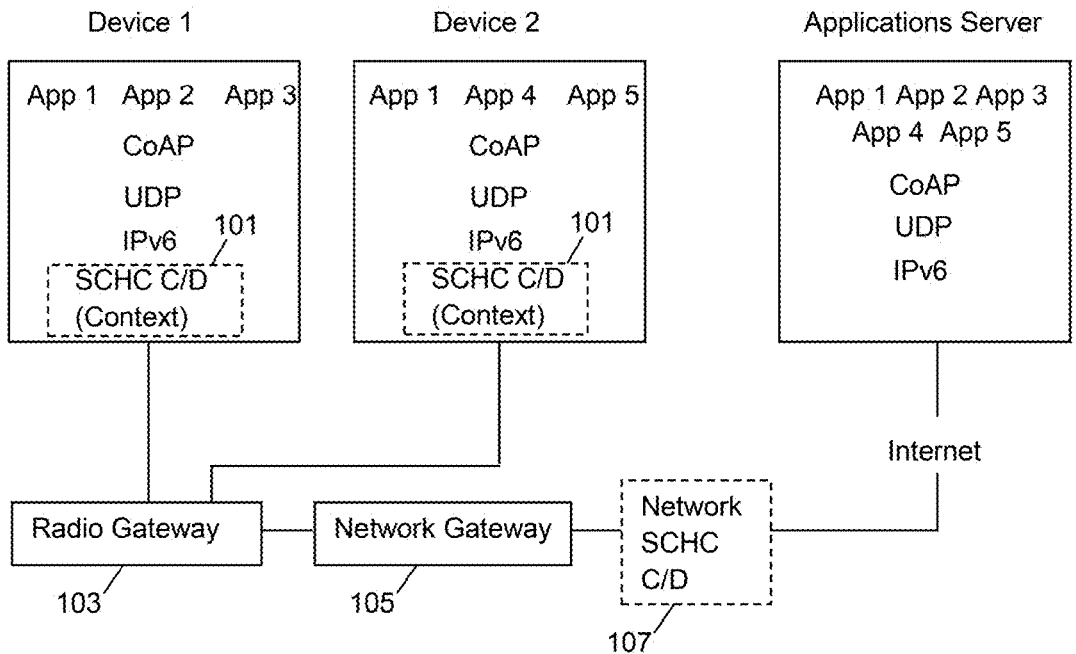
FIG. 1 represents the network architecture of a low-power wide area network implementing static context header compression/decompression of the prior art.
Figure 2:
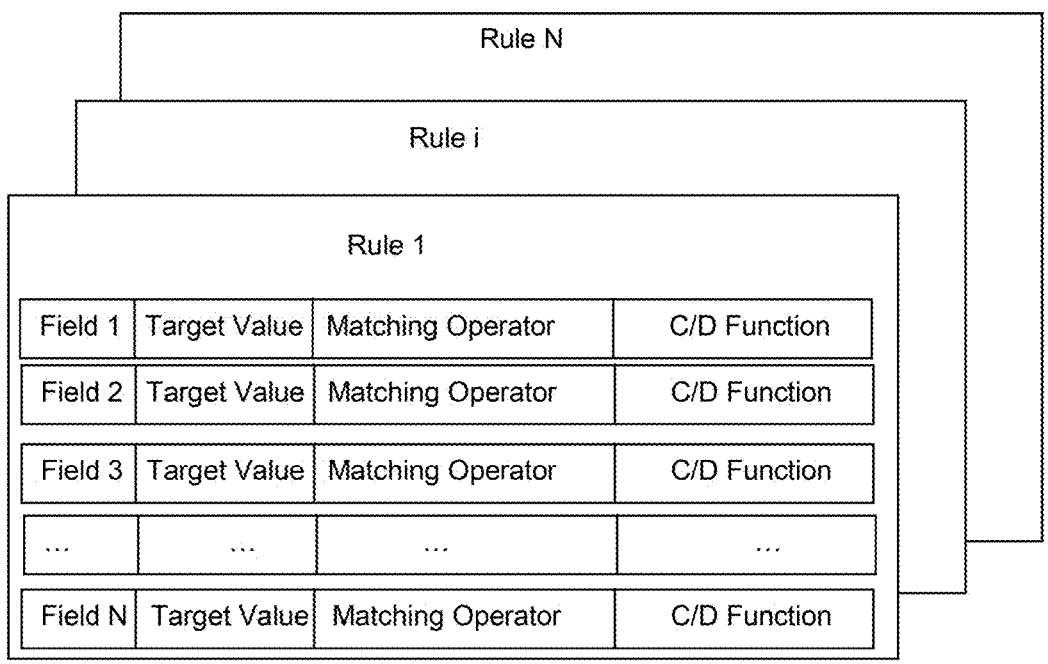
FIG. 2 is a block diagram illustrating the structure of a context used in static header compression/decompression mechanisms of the prior art.
Figure 3A:
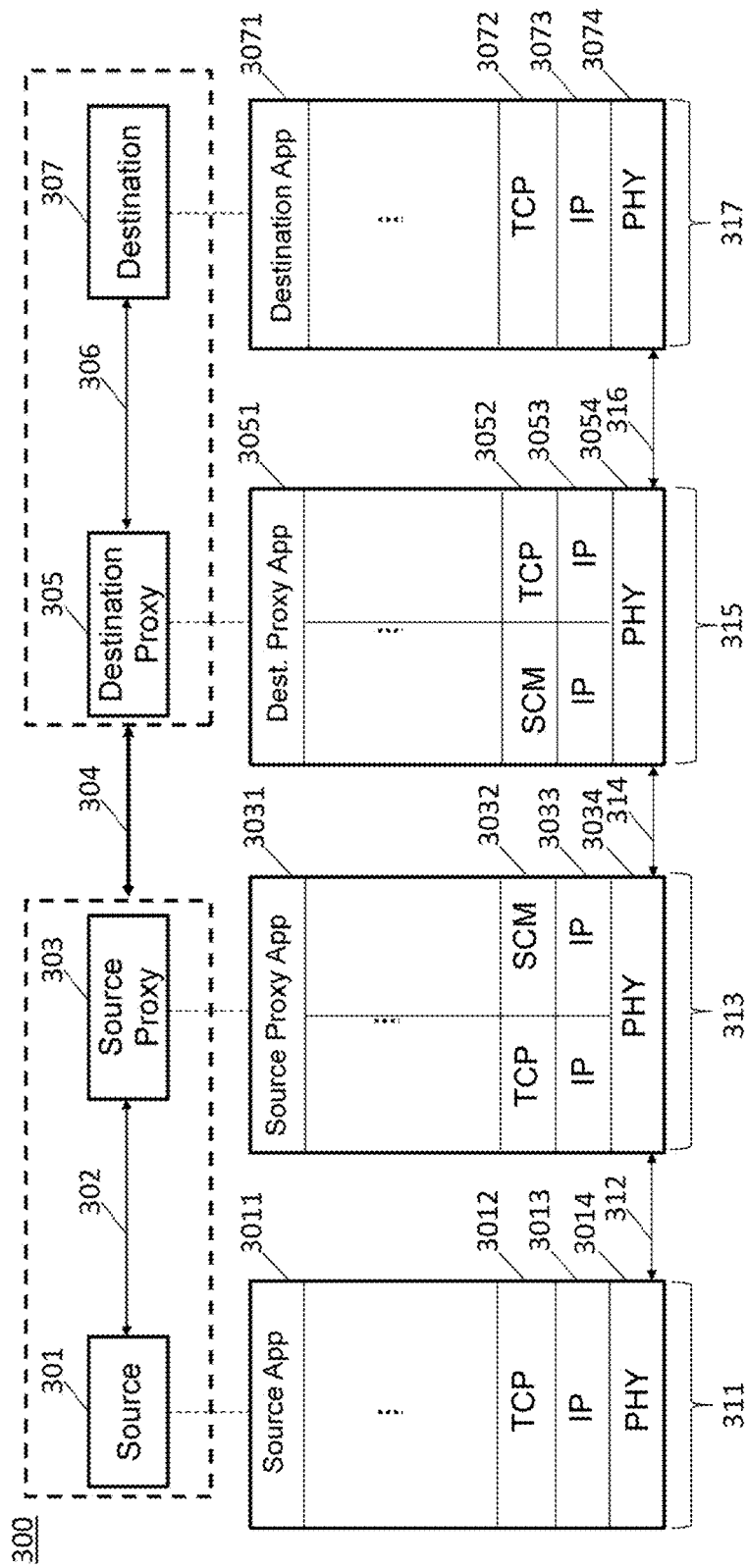
FIG. 3A is a schematic diagram illustrating an exemplary communication system and the protocol stacks of a source, a source proxy, a destination proxy, and a destination proxy, according to some embodiments of the invention.

Referring to FIG. 3A, there is shown an exemplary system 300 in which the embodiments of the invention may be implemented. The system 300 may be any data transmission/communication/collection/processing system in which a source 301 is configured to exchange data comprising TCP/IP flows with a destination 307 over a wireless link 304.

In preferred embodiments, the system 300 may be any IoT network or any M2M network used in consumer, commercial, industrial, and infrastructure applications. Exemplary consumer applications comprise connected vehicles (Internet of Vehicles IoV), home automation/smart home, smart cities, wearable technology, and connected health. Exemplary commercial applications comprise medical and healthcare and transportation. In medicine, a digitized healthcare system connecting medical resources and healthcare services may be used in which special monitors and sensors are used to enable remote health monitoring and emergency notification. In transportation systems, IoT using for example wireless sensors, can provide interaction between the vehicles and the infrastructure as well as inter and intra vehicular communications, smart traffic control, smart parking, and safety and road assistance. Exemplary industrial applications comprise applications in agriculture for example in farming using sensors to collect data on temperature, rainfall, humidity, wind speed, and soil content. Exemplary infrastructure applications comprise the use of IoT devices to perform monitoring and controlling operations of urban and rural infrastructures such as bridges and railway tracks.

The source 301 and/or the destination 307 may be any physical internet-enabled device/object provided with required hardware and/or software technologies enabling communication over Internet. The source 301 and/or the destination 307 may be any standard internet connected-devices such as desktop computers, servers, virtual machines laptops, smart-phones, tablets. In preferred embodiments, the source 301 and/or the destination 307 may be any IoT/M2M device or connected thing operating in an IoT/M2M network such as medical devices, temperature and weather monitors, connected cards, smart meters, game consols, personal digital assistants, health and fitness monitors, lights, thermostats, appliances, garage doors, security devices, drones, smart clothes, eHealth devices, robots, and smart outlets. An IoT/M2M device may be any physical device, vehicle, home appliance, or any object/thing embedded with electronics, software, sensors, actuators, and connectivity enabling remote connection for data collection and exchange with an IoT/M2M platform for example. A sensor may be any sensory organ/object/device (e.g. a transducer) that can measure everything characteristic such as temperature, humidity/moisture, acoustic/sound/vibration, chemical/Gas, force/load/strain/pressure, electric/magnetic, machine vision/optical/ambient light, or position/presence/proximity.

The source 301 and/or the destination 307 may be fixed or mobile and/or may be remotely monitored and/or controlled. The source 301 and/or the destination 307 may be equipped with power sources that provide power to the different components ensuring the functioning of these devices (e.g. dry cell batteries, solar cells, and fuel cells).

The wireless link 304 may represent any wireless network enabling IoT in licensed or license-free spectrum. Exemplary wireless links 304 comprise low-power short range networks and LPWANs. Exemplary LPWAN technologies comprise LoRaWAN, Sigfox, LTE-NB1, NB-IoT, IEEE.802.15.4, and Weightless.

In the system 300, the source 301 and the destination 307 are configured to exchange data comprising TCP/IP traffic including one or more TCP packets over the wireless link 304. Bidirectional communications between the source 301 and the destination 307 are shown in FIG. 3. The source 301 may correspond to a TCP client or a TCP server, depending on the direction of the data flows in uplink or downlink. For example, the source 301 may be a TCP client attempting to communicate with a server which is available over the Internet.

The embodiments of the invention provide communication protocols allowing the support of data comprising TCP/IP traffic over wireless networks 304 using a source proxy 303 and a destination proxy 305. Accordingly, a TCP connection between the source 301 and the destination 307 that are exchanging data comprising TCP/IP traffic over the wireless link 304 may be comprise three intermediate connections involving a source proxy 303 and a destination proxy 305. The exchanged TCP/IP traffic data may comprise one or more TCP packets. The source proxy 303 and the destination proxy 305 may be located at the periphery of the wireless link 304, for example at the wireless network gateways. More specifically, the source proxy 303 may be located at the side of the source 301 and the destination proxy 305 may be located at the side of the destination 307. The source proxy 303 and the destination proxy 305 may be a router, a switcher, or any device operating on the network gateway of the wireless link 304.

The source 301 and the destination 307 may not know that they communicate through a wireless link 304. The source proxy 301 and the destination proxy 307 communicate over the wireless link 304. The source proxy 303 and the destination proxy 305 may be implemented in such a way that the source 301 can only access the source proxy 303 and the destination 307 can only access the destination proxy 305.

The embodiments of the invention provide a simple compression mode protocol used in wireless networks, for instance in constrained networks, that rely on two endpoints, the source 301 and the destination 307. The TCP connection is done out of the wireless network and the simple compression mode protocol will simulate the connection by using one or more proxies, the source proxy 301 and/or the destination proxy 305.

According to some embodiments, the source proxy 303 and the destination proxy 305 may be implemented on the network gateways of the wireless link 304 separately from the source 301 and the destination 307, respectively. This means that the source proxy 303 and the destination proxy 305 may be two devices physically (from a hardware perspective) independent from the source 301 and the destination 307. In such embodiments, i.e. when two proxies are used, the wireless link 304 is in the middle of the TCP connection between the source 301 and the destination 307.

According to other embodiments, the source proxy 303 (or respectively the destination proxy 305) may be implemented at the source device 301 (or respectively at the destination device 307). In such embodiments, the source proxy 303 (or respectively the destination proxy 305) may be implemented in the source device 301 as a hardware part, the source device 301 (respectively the destination 307 device) being configured to implement the functionalities performed by the source proxy 303 (respectively the destination proxy 307). In such embodiments, i.e. when only one proxy is used (the source proxy 301 or the destination proxy 305), depending on which device among the source 301 or the destination 307 implements the proxy functionalities, this device may be configured to use the simple compression mode protocol and may not have to convert the simple compression mode frames into TCP frames.

The communication link between the source 301 and the destination 307 may comprise three segments/links: a source link 302 between the source 301 and the source proxy 303, the wireless link 304 between the source proxy 303 and the destination proxy 305, and a destination link 306 between the destination proxy 305 and the destination 307. The source link 302 and the destination link 306 may be any wired or wireless IP-based links (e.g. wired-Ethernet, wireless-Ethernet, mobile-Ethernet). The source link 302 and/or the destination link 306 may comprise a network of an arbitrary size (e.g. local area network).

In some embodiments, the network on the source link 302 and/or the destination link 306 may comprise multiple access networks providing services to multiple users.

Protocol stacks are represented below the source 301, the source proxy 303, the destination proxy 305, and the destination 307. Accordingly, a TCP connection between the source 301 and the destination 307 is 'virtually' split into three connections: a source TCP connection 312 between the source 301 and the source proxy 303, a wireless connection referred to as 'a simple compression mode connection' 314 between the source proxy 303 and the destination proxy 305, and a destination TCP connection 316 between the destination proxy 305 and the destination 307. TCP packets are transferred over the source TCP connection 312 and the destination TCP connection 316 according to the TCP/IP protocol stack. The source proxy 301 and the destination proxy 305 ensure the transition between the TCP connections (source and destination TCP connections) and the simple compression mode connection over the wireless link 304 by establishing a specific connection enabling to support TCP/IP data over the wireless link 304. TCP data is sent over the wireless link 304 in a new header format using the simple compression mode protocol.

In the source TCP connection 312 and for data sent from the source 301, the source 301 acts as a TCP/IP client and the source proxy 303 acts as a TCP server. Similarly, in the destination TCP connection 316 and for data sent from the destination 317 to the destination proxy 305, the destination 317 acts as a TCP client and the destination proxy 305 acts as a TCP server. The roles of the source 301 and the source proxy 303 (respectively the destination 307 and the destination proxy 305) are interchanged when data is directed from the source proxy 303 to the source 301 (respectively from the destination proxy 305 to the destination 307) where the source 301 acts as a TCP server and the source proxy 303 acts as a TCP client (respectively the destination 307 acts as a TCP server and the destination proxy 305 acts as a TCP client). Bandwidth is saved because the proxy or the proxies only send the TCP data frames over the wireless link, the rest of the TCP frames are generated and kept on the proxy itself to answer with the correct frame over the TCP connection.

The source 301 and the destination 307 may be configured to operate using the standard unmodified TCP/IP protocol stack. Accordingly, the source application layer 3011 of the source 3011 and the destination application layer 3071 of the destination 307 may use TCP applications producing/receiving TCP/IP data such as Web (HTTP), SSH, File Transfer Protocol FTP, telnet, E-mail (Simple Mail Transfer Protocol), IMAP/POP, Secure Shell (SSH), and DNS. The transport layer 3012 of the source 301 and the transport layer 3072 of the destination 307 use the TCP that provides connection-oriented services for transporting application layer services between the source 301 and the source proxy 303 and between the destination 307 and the destination proxy 305. Application data delivered by the source application layer 3011 and the destination application layer 3071 is divided into TCP packets at the transport layers 3012 and 3072. A TCP packet comprises a TCP data section comprising the application data and a TCP header. The TCP packets are then forwarded to the network layers 3013 and 3073 respectively of the source 301 and the destination 307 to be routed across the source link 302 and the destination link 306. The network layers 3013 and 3073 may use the Internet Protocol version 4 (IPv4) or the Internet Protocol version 6 (IPv6). The network layers 3013 and 3073 may use other protocols such as the ICMP (Internet Control Message Protocol), the IGMP (Internet Group Management Protocol), MLD (Multicast Listener Protocol), the ARP (Address Resolution Protocol), the ICMPv6 (Internet Control Message Protocol for IPv6) and the RARP (Reverse Address Resolution Protocol). The TCP packets forwarded to the network layers 3013 and 3073 may be encapsulated into IP datagrams, an IP datagram encapsulating a TCP packet comprising an IP header and an IP data section. The IP datagrams are then moved between the link layers (also referred to as 'physical layers'), for example the link layer 3014 of the source 301 and the link layer 3074 of the destination 307. Data is sent over the link layers in a form of a frame of a given frame size.

According to some embodiments, TLS protocol may be used at the transport layers of the source proxy 303 and the destination proxy 305 to provide a secure simple connection mode connection between the source proxy 303 and the destination proxy 305 enabling prevention against eavesdroppers, tampering, or message forgery.

In embodiments in which the source proxy 303 or the destination proxy 305 is respectively implemented within the source 301 or the destination 307, the source 301 or the destination 307 may be configured to implement a modified TCP/IP protocol stack in which TCP is replaced with simple compression mode (SCM) protocol at the transport layer.

The source proxy 303 and the destination proxy 307 according to the embodiments of the invention may operate using a modified protocol stack to adapt the TCP/IP traffic to the constraints of the wireless link 304. More specifically, the source proxy 303 and the destination proxy 305 may be configured to operate and exchange data according to a SCM protocol that involves a modification of the protocol stacks 313 and 315 of the source proxy 303 and the destination proxy 305 respectively. The source proxy 303 and the destination proxy 305 convert the incoming packets/outcoming packets received/destined from/to the source 301 or from/to the destination 307 so that the incoming packets appear to have originated at the destination 307 and the outcoming packets appear to have originated at the source 301. The simple compression mode protocol provides an efficient connection-oriented link between the source proxy 303 and the destination proxy 305 and a support of TCP/IP packets exchanged between the source 301 and the destination 307.

When the source device 301 sends one or more TCP packets, the source proxy 303 may be configured, according to the simple compression mode protocol, to:

receive the one or more TCP packets sent by the source 301 over the source TCP connection;

determine a simple compression mode packet from the one or more TCP packets sent by the source 301 by removing the TCP packet header comprised in each TCP packet. The simple compression mode packet comprises the TCP data sections comprised in the one or more TCP packets sent by the source 301 and a header that comprises a connection identifier denoted by CID. The CID is used to identify a connection between the source proxy 303 and the destination proxy 305, but it is not needed when there is only a single connection using the identifier.

After constructing the simple compression mode packet, the source proxy 303 may be configured to establish a simple compression mode connection with the destination proxy 305 and send the simple compression mode packet to the destination proxy 305. The destination proxy 305 may be configured to:

receive the simple compression mode packet and acknowledge reception to the source proxy 303;

determine one or more reconstructed TCP packets by extracting the data sections of each TCP packet from the simple compression mode packet; and send the one or more reconstructed TCP packets to the destination device 307.

As illustrated in FIG. 3A, the simple compression mode protocol introduces a modification at the transport layers of the protocol stacks 313 and 315 of the source proxy 303 and the destination proxy 305, respectively.

At the transport layers 3032 and 3052, the TCP protocol is replaced with the simple compression mode protocol that converts incoming/outcoming TCP packets into packets referred to as 'simple compression mode packets'. Incoming/outcoming TCP packets refer to the TCP packets received/directed from/to the source 301 or the destination 307. Accordingly, the TCP does not run on the simple compression mode connection 314.

According to some embodiments, the source proxy 303 and/or the destination proxy 305 may be configured to use TCP receive window buffer size to limit the amount of data to be sent over the wireless link 304.

According to some embodiments, TCP headers may be removed from the TCP packets processed according to the simple compression mode protocol to convert a TCP packet into a simple compression mode packet.

Figure 3B:
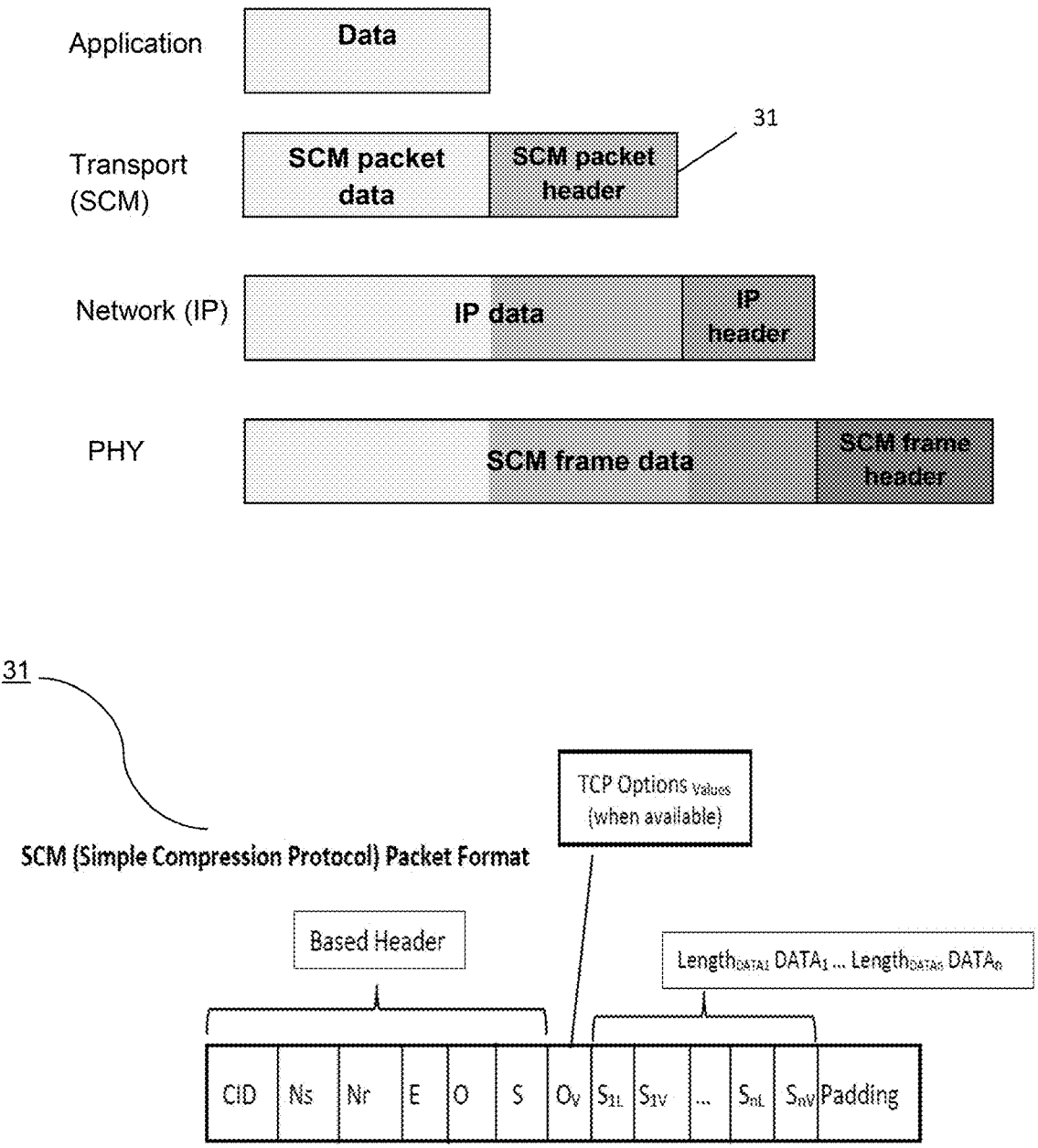
FIG. 3B is a schematic diagram illustrating the protocol data units constructed at a source proxy or a destination proxy, according to some embodiments.

Referring to FIG. 3B, there is illustrated the encapsulation of application data descending through the layers of the source proxy 303 and the structures of the protocol data units according to the modified protocol stack of the source proxy 303. The same protocol data units apply at the destination proxy 305 in an ascending direction from the physical layer to the application layer to process a received simple compression mode frame from the source proxy 303. The destination proxy 305 may be configured to perform symmetric operations according to the operations performed by the source proxy 303. The section labeled 'Data' refers to the application data produced/received at the application layers 3031. At the transport layer 3032 implementing the simple compression mode protocol, the source proxy 303 may be configured to encapsulate application data into a simple compression mode packet. The simple compression mode packet comprise a simple compression mode data section that comprises the data sections of one or more TCP packets previously received from the source 301 and a simple compression mode packet header (e.g. an LPWAN layer 2 frame header). The source proxy 303 may be further configured to encapsulate each simple compression mode packet into an IP datagram at the network layer 3033. An IP datagram encapsulating a SCM packet comprises an IP data section that contains the SCM packet and an IP header. The source proxy 303 may be configured to further to encapsulate the IP datagram into a simple compression mode frame at the physical layer 3034. The source proxy 303 and the destination proxy 305 may be configured to exchange simple compression mode frames over the wireless link 304 and to acknowledge reception of each simple compression mode frame.

As illustrated in FIG. 3B, a simple connected mode packet may comprise an SCM packet data and a header (also referred to as 'a based header'). The SCM packet data may comprise values of TCP options when available, data comprising n data values denoted by $DATA_1, \ldots, DATA_n$. The length of a data $DATA_i$ for $i=1, \ldots, n$ is denoted by $length_{DATAi}$. The data will be sent with the format LV designating (Length, Value). The section denoted by $S_{iL}$ for $i=1, \ldots, n$ comprises the length of $DATA_i$ and the section denoted by $S_{iV}$ comprises the value of $DATA_i$. The SCM packet may further comprise a padding section that may be used when needed. No more than 7 bits of padding may be used. The padding may be added after the concatenation of the data to the SCM header so it will be easy to retrieve the padding.

According to some embodiments with reference to FIG. 3B, in addition to the connection identifier, the header of a simple compression mode packet may further comprise:

a first next field denoted by Ns (referred to 'send-sequence number' or 'Sequence Number of the Source') representing a number of the simple compression mode packet sent by the source proxy 303 to the destination proxy 305 and that is incremented by one each time a SCM packet is sent. This field as a variable length;

a second next field denoted by Nr (referred to 'receive-sequence number' or 'Sequence Number of the destination) representing a number of the simple compression mode packet expected to be received by the source proxy 303 from the destination proxy 305, and that is incremented by one each time a packet is sent in the other direction. This field has a variable length;

a third next field denoted by E (ending connection), indicating if a TCP connection end is delivered by the source 301 or the destination 307. This field is 1-bit length and is set when the connection between the source 301 and the destination 307 needs to be closed. Otherwise, the E=0 is sent;

a fourth next field denoted by S (single frame), indicating if the SCM packet contains one or multiple TCP data frames not concatenated but together in the same SCM packet. This field in a 1-bit length. When it is set, this means that the SCM packet carries multiple TCP packets. When there is a single TCP packet, the bit is neither set and sent. The SCM packet data is sent after an option field or after the based header fields when options field is not sent;

a fifth next field denoted by O (options), indicating if there are some TCP options to be sent, TCP options representing a field comprised in a TCP packet header. This field has a variable length field which gives the length of the TCP options that will be placed just after the end of the based header. When this field is not set, it is not sent.

The length of each field is connection-dependent and is defined while the transmission is used.

The SCM protocol is used to transport TCP packets over the wireless link 304. Accordingly, the TCP header of each TCP packet is compressed into some signaling bits. The TCP connection establishment and retransmissions request may not be sent over the wireless link 304. Only the TCP data packets and end connection are sent under the wireless link 304 by the source proxy 303 and the destination proxy 305.

According to some embodiments, the source proxy 303 may be configured to send, to the destination proxy 305, a simple compression mode packet that comprises empty TCP data (i.e. empty SCM packet data section) and a third next field equal to a predefined end bit value if a connection end is delivered by the source device 301. The destination proxy 305 may be configured to send, to the source proxy 303 a simple compression mode packet that comprises empty SCM packet data section and a third next field equal to a predefined end bit value if a connection end is delivered by the destination device 307.

No opening connection is sent over the SCM by the source proxy 303 and the destination proxy 305 to reduce delay.

According to some embodiments, the source proxy 303 and the destination proxy 305 may be configured to perform frame fragmentation in order to fragment each simple compression mode frame into two or more fragments depending on a predefined frame size related to specifications of the link layer of the wireless link 304. Frame fragmentation may be advantageously used to reduce the amount of data transmitted over the wireless link 304 and to adapt the frame size to the link layer frame size. Frame reassembly may be performed at the source proxy 303 or the destination proxy 305 when receiving fragmented frames over the wireless link 304.

According to some embodiments, the simple compression mode protocol may be used in combination with header compression/decompression protocols applied at different layers of the protocol stacks of the source proxy 303 and the destination proxy 305 to reduce the size of the headers of the corresponding protocol data units. The SCM protocol only affects the transport layers of the source proxy 303 and the destination proxy 305 and may be used with any header compression/decompression protocols such as RoHC, SCHC, or VJ. In such embodiments, the source proxy 303 and the destination proxy 305 may implement a compression/decompression unit configured to perform header compression/decompression at least to a protocol header prior to sending the simple compression mode frames over the wireless link 304. In such embodiments, the header lengths must be known by the source proxy 303 and the destination proxy 305.

Figure 3C:
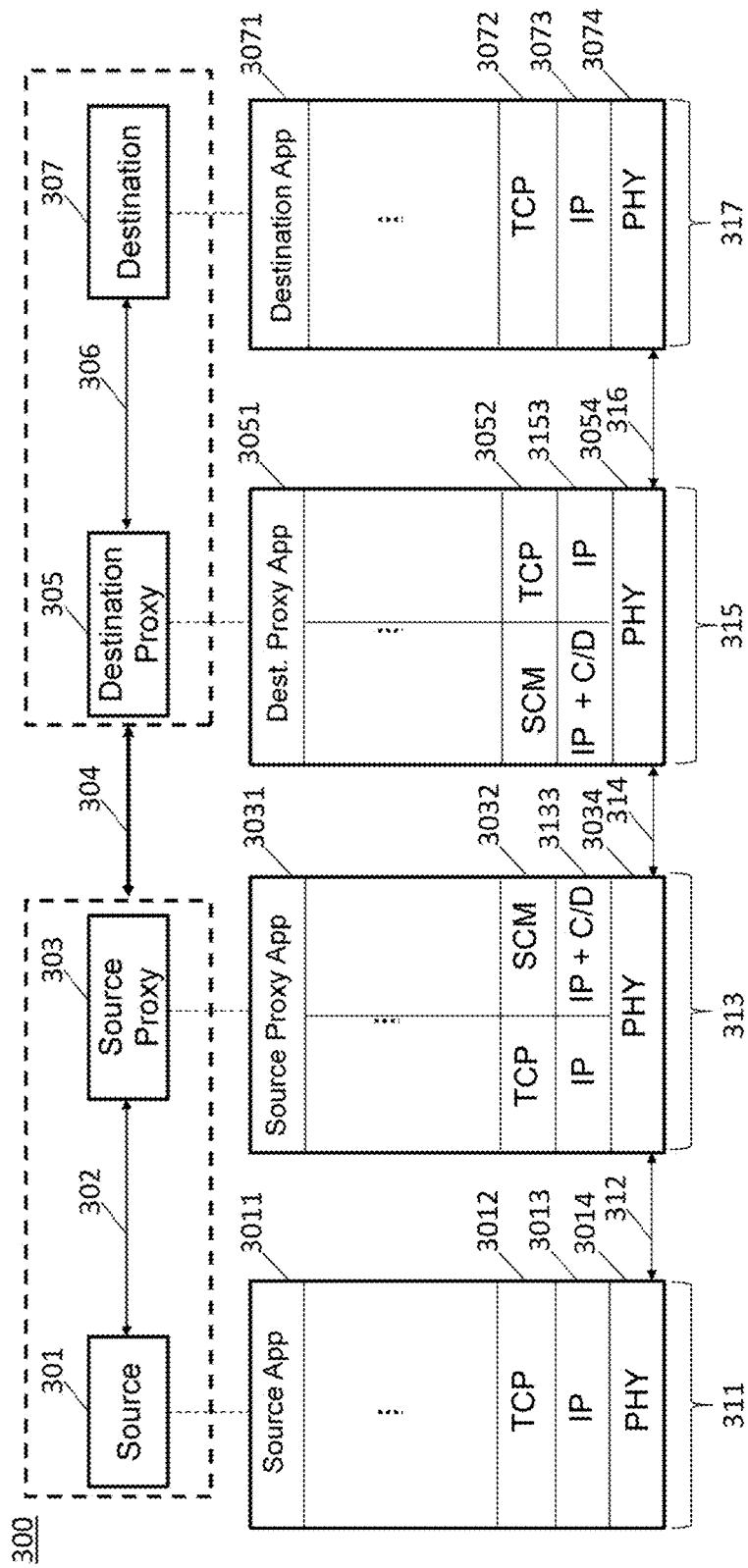
FIG. 3C is a schematic diagram illustrating an exemplary communication system and the protocol stacks of a source, a source proxy, a destination proxy, and a destination proxy, according to some embodiments of the invention in which header compression/decompression is performed to IP datagram headers.

Referring to FIG. 3C, there is illustrated an exemplary implementation of the SCM protocol at the transport layers 3032 and 3052 of the protocol stacks of the source proxy 303 and the destination proxy 305 together with the application of IP header compression/decompression at the network layers 3133 and 3153 of the source proxy 303 and the destination proxy 305, respectively. Each of the source proxy 303 and the destination proxy 305 may implement a header compression/decompression unit (C/D) configured to perform header compression to remove unused fields (e.g. flow label and traffic class) and redundant information (e.g. interface identifier in the IPv6 address). Performing header compression or decompression by the source proxy 303 or the destination proxy 305 depends on the direction of the simple compression mode packet. For example, when a simple compression mode is directed from the source proxy 303 to the destination proxy 305, the source proxy 303 performs IP header compression and the destination proxy 305 performs IP header decompression.

For example, for data directed from the source proxy 303 to the destination proxy 305, the source proxy 303 may be configured to perform header compression to each IP datagram including TCP port numbers encapsulating a simple compression mode packet. Header compression applied to compress an IP datagram provides an IP header residue and is associated with a rule identifier. The source proxy 303 may be further configured to encapsulate the obtained IP datagram into a simple compression mode frame. The simple compression mode frame comprises, in addition to the SCM packet (that comprises TCP packet data section) encapsulated in the IP datagram, the IP header compression residue and the rule identifier corresponding to the header compression applied to the IP datagram. When receiving the simple compression mode frame, the destination proxy 305 may be configured to perform header decompression to the IP datagram encapsulated in each received simple compression mode frame according to the rule identifier and the IP header compression residue.

Figure 4:
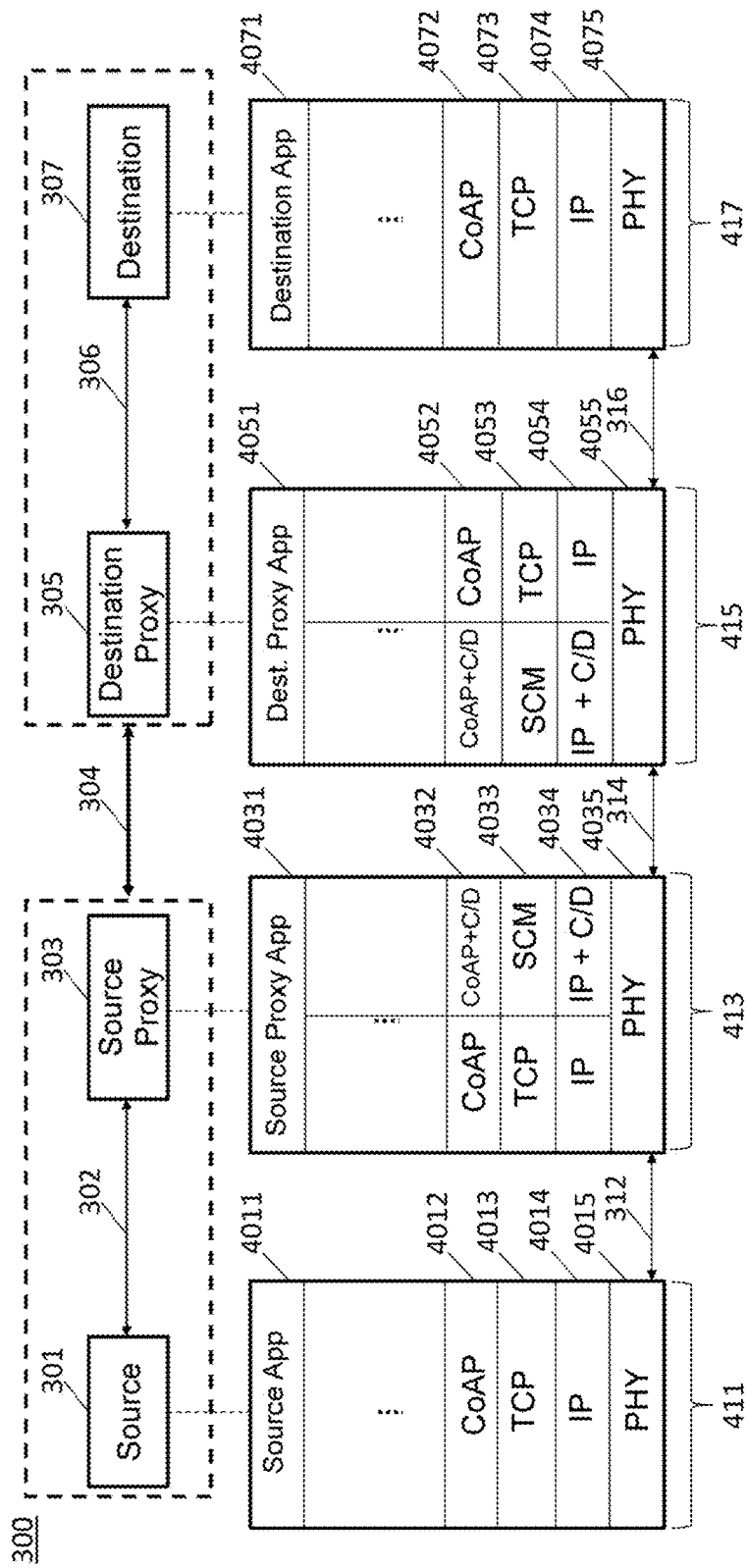
FIG. 4 is a schematic diagram illustrating an exemplary communication system and the protocol stacks of a source, a source proxy, a destination proxy, and a destination proxy, according to some embodiments of the invention in which header compression/decompression is performed to IP datagram headers and CoAP message headers.

Referring to FIG. 4, there is illustrated an exemplary implementation of the SCM protocol in embodiments in which the CoAP/TCP/IP protocol stacks are used at the source 301 and the destination 307 at the layers 4012 and 4072 respectively. The source 301 and the destination 307 accordingly use a constrained application protocol that produces/receives constrained application messages comprised in each TCP packet. In such embodiments, and for data sent from the source proxy 303 to the destination proxy 305, in addition to the header compression/decompression performed to the IP headers, the source 303 may be configured to perform header compression/decompression to the header of each constrained protocol message at the layer 4032, header compression providing header compression residue and being associated with a rule identifier. In such embodiments, the simple compression mode frame determined at the layer 4035 from one or more TCP packets that comprise constrained application protocol data may further comprise, in addition to the SCM packet and the rule identifier and IP compression residue corresponding to the IP header compression, the rule identifier and the header compression residue corresponding to the compression of the CoAP message header. The destination proxy 305 may be configured to perform, in addition to the IP header decompression applied to the IP datagram encapsulated in the received simple compression mode frame, header decompression to the header of each constrained protocol message comprised in each reconstructed TCP packet according to the header compression residue and the rule identifier corresponding to the compression of the CoAP message header.

According to some embodiments, the source proxy 303 and the destination proxy 305 may be configured to perform header compression/decompression to compress IP headers and, when applicable, CoAP message headers, by applying the static context header compression protocol.

In such embodiments, each of the source proxy 303 and the destination proxy 305 may be configured to store the shared header compression/decompression contexts for example in a non-volatile memory. The stored contexts define how the protocol headers are compressed/decompressed at the source proxy 303 and the destination proxy 305. The compression rules support bidirectional communications at both the source proxy 303 and destination proxy 305. The header compression contexts may be pre-provided to the source proxy 303 and/or to the destination proxy 305 at the deployment of the system 300.

According to some embodiments, the source proxy 303 and/or the destination proxy 305 may be configured to update one or more of the header compression contexts.

According to some embodiments, each rule identifier associated with the compression/decompression of the header of an IP datagram encapsulating a simple compression mode packet and the header of a CoAP message header may be related with the connection identifier used to identify the connection between the source proxy 303 and the destination proxy 305. In such embodiments, the source proxy 303 and the destination proxy 305 may be configured to store a mapping table in which each rule identifier is mapped to a connection identifier. The compression rule may define the fields of the SCM packet and the CID may take the value of the Rule ID corresponding to the compression rule.

In order to illustrate the operations performed at each component of the system 300, an example of a TCP session for transmitting one or more TCP packets from the source 301 to the destination 307 is illustrated hereinafter with reference to FIG. 3C. The source 301 designates a TCP session initiator (a TCP client in uplink communications or a TCP server in downlink communications) configured to produce one or more TCP packets to be delivered to the destination 307, here designating a TCP session receiver (a TCP server in uplink communications or a TCP client in downlink communications). The TCP packets go down the protocol stack 311.

The source 301 may be configured to initiate a TCP connection. According to the SCM protocol, the TCP packets sent from the source 301 are processed at the source proxy 303 and sent over the wireless link in the form of SCM packets. The TCP packets sent from the source 301 arrive to the source proxy 303 over the source TCP connection according to the TCP/IP protocol stack. This means that the source 301 divides the application data produced by the source application layer 3011 into TCP packets at the transport layer 3012, then encapsulates, at the network layer 3014, each TCP packet delivered by the transport layer 3012 into an IP datagram and encapsulates, at the physical layer 3014, the IP datagram into a frame and transfers the obtained frame over the source TCP connection 312 to the source proxy 303. When receiving the TCP packets sent over the source TCP connection, the source proxy 303 acts as a TCP server to recover, at the network layer 3033 the IP datagrams encapsulating TCP packets sent by the source 301, and at the transport layer 3032, the TCP packets sent by the source 301. In order to communicate the TCP packets to the destination 307, the source proxy 303 converts the TCP packets at the transport layer 3032 into a simple compression mode packet encapsulated into an IP datagram at the network layer 3133, then communicates the simple compression mode frame encapsulating the obtained IP datagram to the destination proxy 307 over the wireless connection 314. Accordingly, the source proxy 303 converts each TCP packet at the modified transport layer 3032 into a simple compression mode packet that comprises the data section comprised in the processed TCP packet, the TCP packet conversion comprises removing the TCP packet header such that the corresponding SCM packet comprises the data section and a header comprising a connection identifier used to identify the SCM connection 314. The source proxy 303 then encapsulates each SCM into an IP datagram at the modified network layer 3133 and applies header compression to the IP header of the IP datagram, header compression providing a header compression residue and a rule identifier related to the connection identifier comprised in the header of the SCM packet. The converted IP datagram goes down the protocol stack. At the physical layer 3034, the proxy 303 encapsulates each IP datagram into a simple compression mode frame. A simple connected frame determined from an IP datagram encapsulating a SCM packet comprises the SCM packet, the header compression residue and the rule identifier provided by the IP header compression performed to obtain the converted IP datagram.

The source proxy 303 may be then configured to establish a simple mode connection with the destination proxy 305 over which the source proxy 303 sends the simple mode connected frame which comprises the simple mode connected packets.

The destination proxy 305 may be configured to receive the simple compression mode frame at the link layer 3054 and to acknowledge the reception of the simple compression mode frame to the source proxy 303 by sending an acknowledgment simple compression mode message. The received simple compression mode frame goes up the protocol stack. At the modified network layer 3153, destination proxy 305 may be configured to determine a reconstructed IP datagram by performing IP header decompression to the IP datagram contained in the received SCM frame and to determine a reconstructed SCM packet by decapsulating the IP datagram. Header decompression is performed according to the header compression residue and rule identifier comprised in the SCM frame. At the modified transport layer 3052, the destination proxy 305 may be configured to determine reconstructed TCP packets from the reconstructed SCM packets. The destination proxy 305 may be then configured to send the reconstructed TCP packets to the destination 307 over the destination TCP connection according to the TCP/IP protocol stack in which the destination proxy 305 acts as a TCP client and the destination 307 acts as a TCP server.

The simple compression mode connection established between the source proxy 303 and the destination proxy 305 is transparent to the source 301 and the destination 307 and aims at enabling transporting TCP packets between the source 301 and the destination 307 over the wireless link 304.

Figure 5:
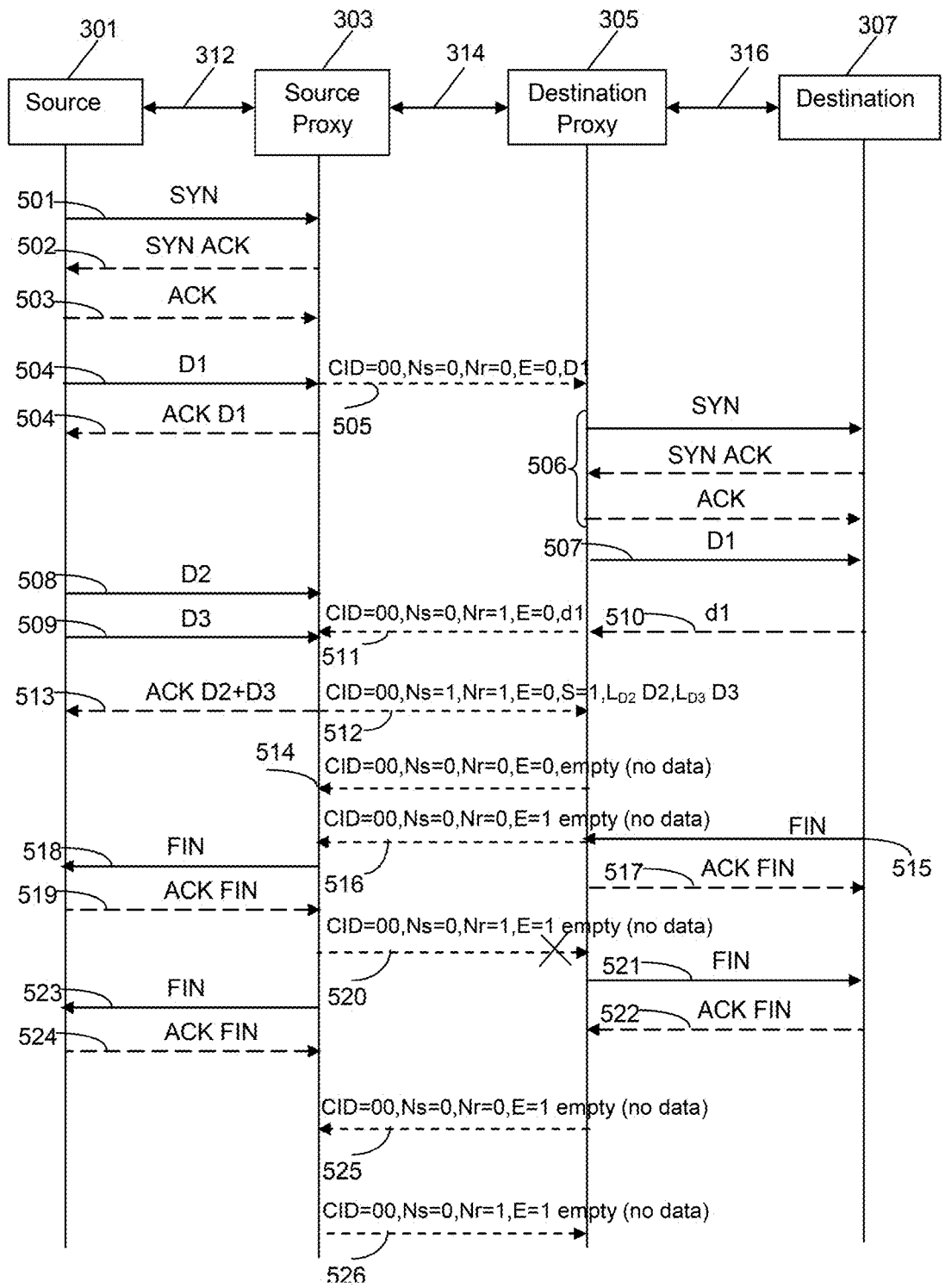
FIG. 5 is a connection flow of an exemplary communication between a source and a destination, according to some embodiments.

FIG. 5 is a connection flow illustrating an exemplary end-to-end connection between the source 301 and the destination 305 aiming at sending three TCP packets, referred to as D1, D2, and D3, from the source 301 to the destination 305, according to some embodiments of the invention.

The source 301 refers hereinafter to the TCP session initiator delivering TCP packets and the destination 307 refers to the TCP session receiver to which are destined the TCP packets produced by the source 301. The TCP packets are transmitted from the source 301 to the destination 305 and are processed at the source proxy 303 and the destination proxy 305 where they are converted into SCM packets for transmission over the wireless link.

The source initiates a TCP connection at step 501 by sending a SYN TCP packet to the destination 307. The SYN packet arrives to the source proxy over the source TCP connection 312. The source proxy 303 receives the SYN packet and recognizes that the source 301 is attempting to make a TCP connection to the destination 307 and that the received SYN packet is destined to the destination 307. The source proxy 303 acknowledges the source's SYN packet at step 502 by sending a SYN ACK packet. This SYN ACK packet is modified so that the source 301 thinks that it is coming from the destination 307. The source 301 acknowledges the source proxy's SYN packet at step 503 and a source TCP connection is established.

The source 301 sends a TCP packet D1 over the source TCP connection at step 504. The TCP packet D1 sent from the source 301 arrives to the source proxy 303 over the source TCP connection. The source proxy 303 intercepts the TCP packet D1 and converts it into a simple compression mode packet denoted by 'CID=00,Ns=0,Nr=0,E=0,D1' according to the simple compression mode protocol. The simple compression mode packet corresponds to the first single data packet that comprises the data section comprised in the TCP packet D1 and sent from the source proxy 303 to the destination proxy 305. Each time the proxy 303 see a new CID number, it signals that a new connection must be opened between 303 and 301.

Prior to any communication between the source 301 and the destination 307 in accordance with the present embodiment, a simple compression mode session is established between the source proxy 303 and the destination proxy 305.

At step 505, the source proxy 303 sends the simple compression mode packet 'CID=00,Ns=0,Nr=0,E=0,D1' to the destination proxy 305 over the wireless connection 314 in which a simple compression mode connection is established. The destination proxy 305 is thus told by the source proxy 303 that the source 301 is attempting to start a TCP connection with the destination 307. The destination proxy 305 establishes a destination TCP connection with the destination 307 at the steps 506 and once the destination TCP connection has been successfully established, the destination proxy 305 converts back the simple compression mode packet 'CID=00,Ns=0,Nr=0,E=0,D1' to a TCP packet D1 and sends the reconstructed TCP packet D1 at step 507 to the destination 307. The source 301 communicates with the destination 307 through the source proxy 303 and the destination proxy 307. TCP packets are sent back and forth until either the source 301 or the destination 307 ends the connection. The SCM protocol works by sending SCM packets between the source proxy 303 and the destination proxy and receiving acknowledgments in the form of SCM acknowledgment packets. Similarly, the source 301 and the destination 307 send respectively to the source proxy 303 and to the destination proxy 305 acknowledgments on reception of TCP packets in the form of TCP acknowledgment packets. The acknowledgment packets may further carry piggybacked data.

Steps 508 and 509 correspond respectively to the transmission of the TCP packet D2 and D3 from the source 301. The source proxy 301 waits to receive the SCM acknowledgment packet corresponding to the SCM packet 'CID=00, Ns=0,Nr=0,E=0,D1' sent at step 505 prior to repackaging and sending the TCP packets D2 and D3. At step 510, the destination 507 acknowledges reception of the D1 packet to the destination proxy 305 by sending the TCP packet d1. Upon receiving this acknowledgment, the destination proxy 305 acknowledges to the source proxy 303 that the TCP packet has been successfully delivered to the destination 307 by sending a SCM acknowledgment packet 'CID=00,Ns=0, Nr=1,E=0,d1' comprising the d1 TCP packet. Upon receiving the SCM acknowledgment packet 'CID=00,Ns=0,Nr=1, E=0,d1', the source proxy 303 can process the TCP packets D2 and D3 and transmit the converted SCM packets to the destination proxy 305. More specifically, the source proxy 303 may be configured to group the TCP packets D2 and D3 and convert them into a single SCM packet 'CID=00,Ns=1, Nr=1,S=1,E=0,$L_{D2}$ D2, $L_{D3}$ D3'. This SCM packets corresponds to the second data packet sent from the source proxy 303 to the destination proxy 305, it contains two TCP packets. The corresponding data sections in the SCM packet data section are D2 of length $L_{D2}$ and D3 of length $L_{D3}$. The source proxy 303 sends TCP acknowledgment packet ACK D2+D3 to the source 301 at step 513 to acknowledge reception of the TCP packets D2 and D3. Reconstruction and transmission of the TCP packets D2 and D3 to the destination 307 are not illustrated in FIG. 5 but are performed similarly to the transmission of the TCP packet D1 from the destination proxy 305 to the destination 307.

In some embodiments, the TCP packets may arrive at the destination proxy 305 in a different order. In such embodiments, the destination proxy 305 may be configured to reorder the reconstructed TCP packets according to their original order.

At step 514, the destination proxy 305 sends an empty acknowledgment SCM packet 'CID=00,Ns=0,Nr=0,E=0 empty (no data)' to the source proxy 303 with empty data indicating that there is no data to be sent.

At step 515, the destination 307 sends a FIN TCP packet to the destination proxy 305 indicating that the destination 307 wishes to end the TCP connection. Upon receiving the FIN TCP packet, the destination proxy 305 acknowledges at step 517 reception of this packet to the destination and sends, at step 516 an SCM packet 'CID=00,Ns=0,Nr=0,E=1 empty (no data)' to the source proxy 303, the SCM packet comprising empty payload and an End-bit. Upon receiving the end SCM packet, the source proxy 303 asks the source 301 to end the TCP connection by sending a FIN TCP packet at step 518. The source 301 acknowledges reception of the FIN TCP packet by sending, at step 519 FIN acknowledgment TCP packet. The CID may be reused to indicate opening a new connection.

Step 520 indicates that the end SCM packet sent by the destination proxy 305 at step 516 was lost. Then the destination sends, at step 521, a FIN TCP packet to the destination 307 to ask again to end the TCP connection. The destination acknowledges reception of the FIN TCP packet at step 522. The source proxy 303 sends a FIN TCP packet to the source 301 to end the TCP connection and the source 301 acknowledges reception of the FIN TCP packet. Losing the SCM packet indicating end of the connection at step 520 would trigger the retransmission of the SCM packet 'CID=00,Ns=0,Nr=0,E=1 empty (no data)' by the destination proxy 305 at step 525 indicating an end of connection request from the destination 307 to the source 301 and acknowledgment by the source proxy 303 at step 626 by sending an end SCM packet 'CID=00,Ns=0,Nr=1,E=1 empty (no data)' carrying and end-bit and empty payload indicating the end of connection from the source proxy 303 to the destination proxy 305.

Figure 6:
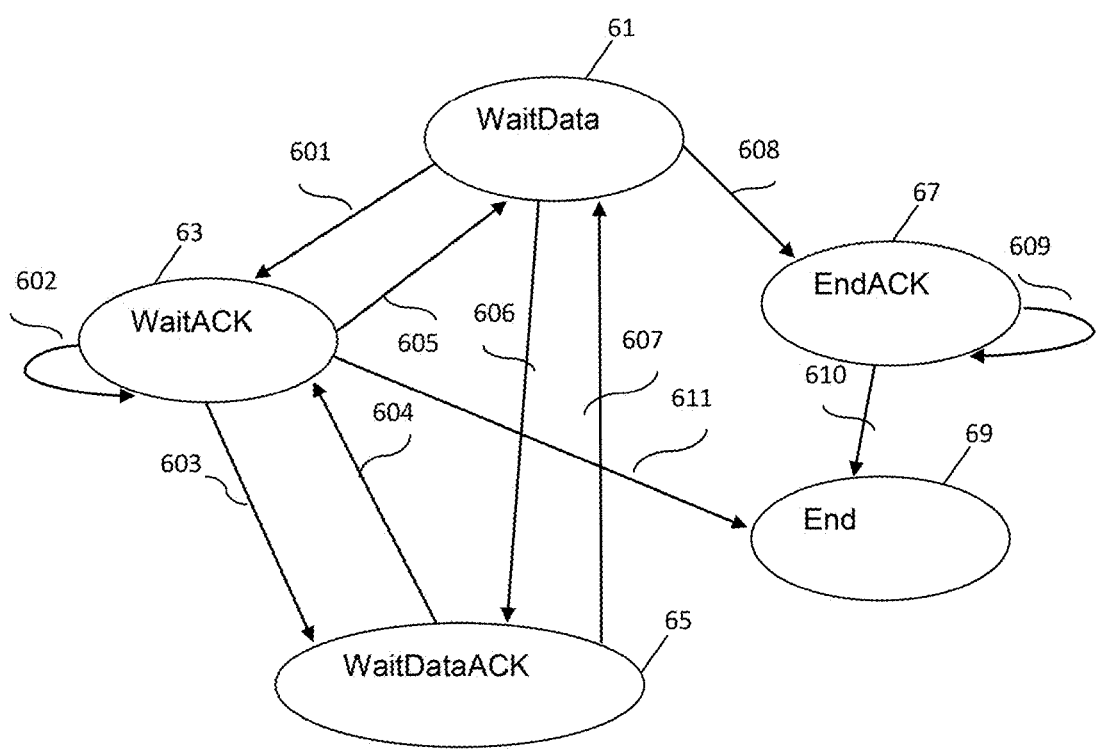
FIG. 6 is a state diagram illustrating the states and state changes of the simple compression mode according to some embodiments.

FIG. 6 is a state diagram illustrating the different states and transitions occurring on the source proxy 303 or the destination proxy 305 using the simple compression mode protocol according to some embodiments of the invention. The description of the states and transitions depicted in FIG. 6 will be made with reference to the source proxy 303 for illustration purposes only. However the state diagrams applies interchangeably to the destination proxy 305.

After the source TCP connection establishment, the source proxy 303 initializes the value of connection ID, Ns (Send-Sequence number), Nr (Receive-Sequence number) and reaches the initial state which is the WaitData 61 state.

In this state, the source proxy 303 may be configured either
  i) to receive TCP data from the source 301; or
  ii) to receive connection close event from the source 301; or
  iii) to receive data from the destination proxy 303; or
  iv) to receive connection termination from the destination proxy 303.

If the event i) occurs, the source proxy 301 may be configured to send the received TCP data in a SCM frame to the destination proxy 303, corresponding to the transition 601 to the next state WaitACK 63.

If the event ii) occurs, the source proxy 301 may be configured to send a SCM frame with E-bit to the destination proxy 303 so that the destination proxy 303 may initiate a destination TCP connection termination with the destination 307, corresponding to the transition 601 to WaitACK 63 state.

If the event iii) occurs, the source proxy 301 may be configured to check if local Nr and the Ns comprised in the received data sent by the destination proxy 305 match. In such event, the source proxy 303 may be configured to increment the local Nr, and to send the data received from the destination proxy 305 to the source 301, corresponding to the transitions 606 to the WaitDataACK state 65.

If the event iv) occurs, the state of the source proxy 301 may change to the EndACK state 67 through the transition 608.

The WaitACK state 63 is reached whenever the source proxy 301 sends a SCM frame (with data or Ebit) to the destination proxy 303 and waits for ACK from the destination proxy 303. A timer, called Inactivity timer, may be started at the beginning of this state. The timer may be reset whenever,
  i) data is received from the destination proxy 303.
  ii) the timer expires when the re-transmission of the last sent frame occurs, corresponding to the transition 602.

The SCM frame sent by the destination proxy 303 may contain either:
  i) payload with TCP data and expected Nr serving as ACK, or
  ii) empty payload with expected Nr serving as ACK, or
  iii) end-bit E-bit.

In case of i), the source proxy 303 may be configured to send the data to the source 301, to increment the local Nr and changes to the WaitDataACK state 65 through the transition 603.

In case of ii), the source proxy 301 may be configured to increment the local Ns and to change to the WaitData 61 state through the transition 605.

In case of iii), the source proxy 301 may be configured to transit to the End state 69 through the transition 611.

The WaitDataACK state 65 starts a short timer (compared to the inactivity timer) and waits for any TCP Data from the source 301 before sending ACK for the received data from the destination proxy 305. After timer expiry, the source proxy 303 sends ACK and transition 607 to the WaitData 61 may happen.

While waiting for TCP data from the source 301, the source proxy 303 may
  i) receive TCP data from the source 301, or
  ii) receive a connection close event from the source.

If the event i) occurs, the source proxy 303 may be configured to send the received TCP data from the source 301 in a SCM frame to the destination proxy 305 and transition 604 to the next state WaitACK 63 is performed.

If the event ii) occurs, the source proxy 303 may be configured to send a SCM frame with E-bit set to the destination proxy 303 so that the destination proxy 303 initiates the destination TCP connection termination with the destination 307 and transition 604 to WaitACK 63.

In the EndACK state 67, the source proxy 303 may be configured to wait for acknowledgment SCM (ACK) from the destination proxy 305 for the E-bit SCM frame that it had sent. If the source proxy 303 doesn't receive the ACK SCM frame for a certain inactivity period, it re-transmits the E-bit SCM frame and remains in the same state, corresponding to the transition 609. If the source proxy 303 receives the ACK, transition 610 to the END state 69 occurs.

In the End state 69, all the resources occupied by the source proxy 303 may be released and returned without any errors.

Figure 7:
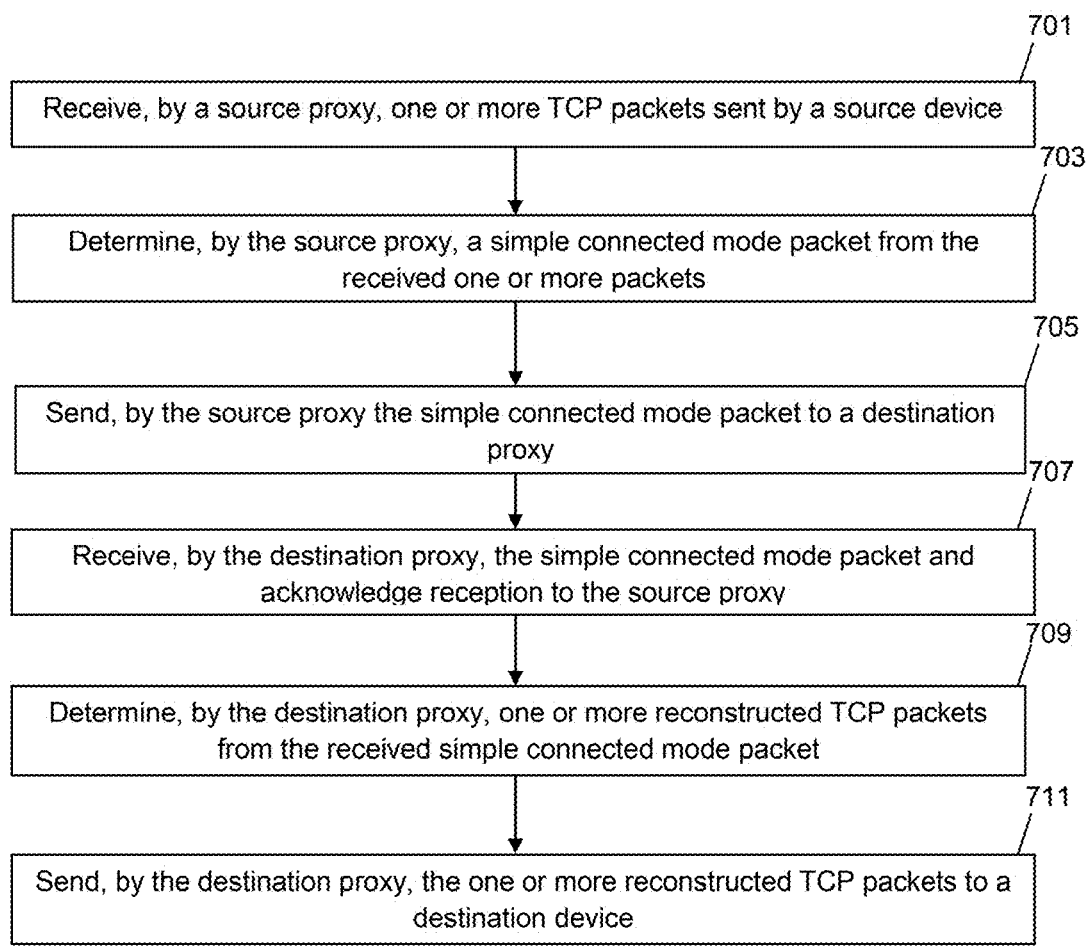
FIG. 7 is a flowchart depicting a method of transmitting TCP data from a source to a destination, according to some embodiments.

Referring to FIG. 7, there is also provided a method for transmitting, by a source proxy 303, one or more TCP packets sent from a source device 301 to a destination device 307 over a wireless link 304. Each TCP packet comprises a TCP data section and a TCP packet header.

At step 701, one or more TCP packets sent by the source 301 may be received by a source proxy 303 located on the wireless link 304.

At step 703, a simple compression mode packet may be determined by the source proxy 303 from the received one or more TCP packets. A simple compression mode packet may be determined by removing the TCP packet header comprised in each TCP packet. The obtained simple compression mode packet comprises the TCP data sections comprised in the received one or more TCP packets and a header that comprises a connection identifier.

At step 705, the simple compression mode packet determined at step 703 may be sent, by the source proxy 303 to a destination proxy 305 located on the wireless link 304.

At step 707, the simple compression mode packet sent by the source proxy 303 may be received by the destination proxy 305. Acknowledgment of reception of the simple compression mode packet may be sent at step 707 by the destination proxy 305 to the source proxy 303.

At step 709, one or more reconstructed TCP packets may be determined by the destination proxy 305 by extracting the data sections of each TCP packet from the received simple compression mode packet.

At step 711, the one or more reconstructed TCP packets may be sent, by the destination proxy 305 to the destination device 307.

There is also provided a program stored in a computer-readable non-transitory medium for transmitting, by a source proxy 303, one or more TCP packets sent from a source device 301 to a destination device 307 over a wireless link 304, each TCP packet comprising a TCP data section and a TCP packet header. The program comprises instructions stored on the computer-readable storage medium that, when executed by a processor, cause the processor to:

receive the one or more TCP packets by a source proxy 303 located on said wireless link 304;

determine, by the source proxy 303, a simple compression mode packet from the one or more TCP packets by removing the TCP packet header comprised in each TCP packet, the simple compression mode packet comprising the TCP data sections comprised in the one or more TCP packets and a header that comprises a connection identifier;

send, by the source proxy 303, the simple compression mode packet to a destination proxy 305 located on the wireless link 304;

receive, by said destination proxy 305, the simple compression mode packet and acknowledging reception of the simple compression mode packet to the source proxy 303;

determine, by the destination proxy 305, one or more reconstructed TCP packets by extracting the data sections of each TCP packet from the simple compression mode packet; and send, by the destination proxy 305, the one or more reconstructed TCP packets to the destination device 307.

The methods and devices described herein may be implemented by various means. For example, these techniques may be implemented in hardware, software, or a combination thereof. For a hardware implementation, the processing elements of the different devices operating in the system 300 can be implemented for example according to a hardware-only configuration (for example in one or more FPGA, ASIC, or VLSI integrated circuits with the corresponding memory) or according to a configuration using both VLSI and Digital Signal Processor (DSP).

Figure 8:
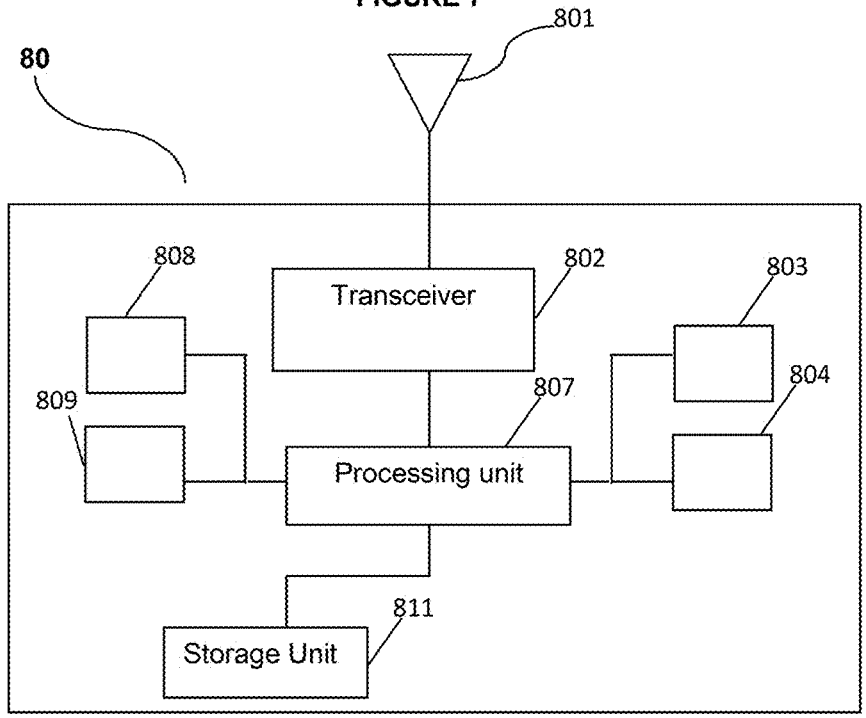
FIG. 8 is a block diagram illustrating the structure of a device operating in a system, according to some embodiments of the invention.

FIG. 8 is a block diagram representing an exemplary hardware/software architecture of a device 80 operating in the system 300 such as the source 301, the destination 307, the source proxy 303, or the destination proxy 305 according to some embodiments of the invention. As illustrated, the architecture may include various computing, processing, storage, communication, sensing, displaying units comprising:

communication circuitry comprising a transceiver 802 and a transmit/receive element 801 (e.g. one or more antennas) configured to connect the device to corresponding links in the system 300, and to ensure transmission/reception of wired or wireless signals. The communication circuitry may support various network and air interface such as wired and wireless networks (e.g. wireless local area networks and cellular networks);

a processing unit 802 configured to execute the computer-executable instructions to run the methods and algorithms according to the various embodiments of the invention for to perform the various required functions of the device such as headers compression/decompression operations, construction of SCM packets/frames, data processing (e.g. input/output processing) and any functionalities required to enable the device to operate in the system 300 according to the embodiments of the invention. The processing unit 802 may be a general purpose processor, a special purpose processor, a DSP, a plurality of microprocessors, a controller, a microcontroller, an ASIC, an FPGA circuit, any type of integrated circuit, and the like;

a power source 803 that may be any suitable device providing power to the device 80 such as dry cell batteries, solar cells, and fuel cells;

a localization unit 804 such as a GPS chipset implemented in applications that require information indicating the location of the device 80;

a storage 811 possibly comprising a random access memory (RAM) or a read-only memory used to store processed data (e.g. TCP packets, contexts, compression residues) and any data required to perform the functionalities of the device 80 according to the embodiments of the invention;

Input peripherals 808;

Output peripherals 809 comprising communication means such as displays enabling for example man-to-machine interaction between the device 80 and the system 300 administrator for example for configuration and/or maintenance purposes.

The architecture of the device 80 may further comprise one or more software and/or hardware units configured to provide additional features, functionalities and/or network connectivity. Such units comprise for example sensors, digital cameras, vibration devices, a Bluetooth module, a media player, an Internet browser, and the like.

Furthermore, the method described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A source proxy for transmitting one or more transport control protocol (TCP) packets sent from a source device to a destination device over a wireless link, each TCP packet comprising a TCP data section and a TCP packet header, wherein the source proxy is located on said wireless link and is configured to:
   receive said one or more TCP packets;
   determine a simple compression mode packet from said one or more TCP packets by removing the TCP packet header comprised in each TCP packet, said simple compression mode packet comprising the TCP data sections comprised in said one or more TCP packets and a header that comprises a connection identifier; and
   send said simple compression mode packet to a destination proxy located on said wireless link, the destination proxy being configured to:
      receive said simple compression mode packet and acknowledge reception to the source proxy;
      determine one or more reconstructed TCP packets by extracting the data sections of each TCP packet from said simple compression mode packet; and
      send said one or more reconstructed TCP packets to the destination device,
   wherein said connection identifier identifies a connection between said source proxy and said destination proxy, the header of said simple compression mode packet further comprising:
      a first next field representing a number of the simple compression mode packet sent by the source proxy and being incremented by one each time a simple compression mode packet is sent by the source proxy;
      a second next field representing a number of the simple compression mode packet received by the source proxy from the destination proxy and being incremented by one each time a simple compression mode packet is sent from the destination proxy to the source proxy; and
      a third next field indicating if a connection end is delivered by the source or the destination.

2. The source proxy of claim 1, wherein said connection identifier identifies a connection between said source proxy and said destination proxy, a TCP packet header comprising an options field, the header of said simple compression mode packet further comprising:
   a fourth next field indicating if said simple compression mode packet comprises one or multiple TCP packets; and
   a fifth next field indicating if said options field is to be comprised in the simple compression mode packet.

3. The source proxy of claim 2, wherein the source proxy is configured to send, to the destination proxy, a simple compression mode packet that comprises empty TCP data and a third next field equal to a predefined end bit value if a connection end is delivered by the source device, the destination proxy being configured to send, to the source proxy a simple compression mode packet that comprises empty TCP data and a third next field equal to a predefined end bit value if a connection end is delivered by the destination device.

4. The source proxy of claim 1, wherein the source device is configured to exchange TCP packets with the source proxy over a source TCP connection according to the transport control protocol/internet protocol (TCP/IP) protocol stack and the destination device is configured to exchange TCP packets with the destination proxy over a destination TCP connection according to the TCP/IP protocol stack.

5. The source proxy of claim 1, wherein the source proxy is further configured to encapsulate each simple compression mode packet into an internet protocol (IP) datagram and to encapsulate said IP datagram into a simple compression mode frame, the source proxy and the destination proxy being configured to exchange simple compression mode frames over said wireless link and to acknowledge reception of each simple compression mode frame.

6. The source proxy of claim 5, wherein the source proxy and the destination proxy are configured to fragment a simple compression mode frame into two or more fragments depending on a predefined frame size related to specifications of the wireless link.

7. The source proxy of claim 5, wherein the source proxy is configured to perform header compression to said IP datagram, header compression applied to said IP datagram providing IP header residue and being associated with a rule identifier, a simple compression mode frame encapsulating said IP datagram further comprising said IP header compression residue and rule identifier, the destination proxy being configured to perform header decompression to the IP datagram encapsulated in each received simple compression mode frame sent by the source proxy according to said rule identifier and IP header compression residue.

8. The source proxy of claim 4, wherein the source device and the destination device are further configured to use a constrained application protocol producing constrained application protocol messages comprised in each TCP packet, the source proxy being further configured to perform header compression to the header of each constrained protocol message, header compression providing header compression residue and being associated with a rule identifier, the simple compression mode frame determined from one or more TCP packets comprising constrained application protocol data further comprising said rule identifier and header compression residue, the destination proxy being further configured to perform header decompression to the header of each constrained protocol message comprised in each reconstructed TCP packet according to said header compression residue and rule identifier.

9. The source proxy of claim 7, wherein header compression and header decompression are performed using a static context header compression protocol.

10. The source proxy of claim 7, wherein each rule identifier is related to a connection identifier, the source proxy and the destination proxy being further configured to store a mapping table in which each rule identifier is mapped to a connection identifier.

11. The source proxy of claim 1, wherein a wireless link is a low-power wide area network or a low-power short range wireless network, the source proxy and the destination proxy being located at gateway nodes in said low-power wide area network or low-power short-range wireless network.

12. The source proxy of claim 11, wherein said low-power wide area network uses a technology chosen in a group comprising the LoRaWan, the Sigfox, the NB-IoT, IEEE.802.15.4, and Weightless.

13. A method for transmitting, by a source proxy, one or more TCP packets sent from a source device to a destination device over a wireless link, each TCP packet comprising a TCP data section and a TCP packet header, wherein the method comprises:
- receiving said one or more TCP packets by a source proxy located on said wireless link;
- determining, by said source proxy, a simple compression mode packet from said one or more TCP packets by removing the TCP packet header comprised in each TCP packet, said simple compression mode packet comprising the TCP data sections comprised in said one or more TCP packets and a header that comprises a connection identifier;
- sending, by said source proxy, the simple compression mode packet to a destination proxy located on said wireless link;
- receiving, by said destination proxy, said simple compression mode packet and acknowledging reception of said simple compression mode packet to the source proxy;
- determining, by the destination proxy, one or more reconstructed TCP packets by extracting the data sections of each TCP packet from said simple compression mode packet; and
- sending, by the destination proxy, said one or more reconstructed TCP packets to the destination device, wherein said connection identifier identifies a connection between said source proxy and said destination proxy, the header of said simple compression mode packet further comprising:
- a first next field representing a number of the simple compression mode packet sent by the source proxy and being incremented by one each time a simple compression mode packet is sent by the source proxy;
- a second next field representing a number of the simple compression mode packet received by the source proxy from the destination proxy and being incremented by one each time a simple compression mode packet is sent from the destination proxy to the source proxy; and
- a third next field indicating if a connection end is delivered by the source or the destination.

14. A program stored in a computer-readable non-transitory medium for transmitting, by a source proxy, one or more TCP packets sent from a source device to a destination device over a wireless link, each TCP packet comprising a TCP data section and a TCP packet header, the program comprising instructions stored on the computer-readable storage medium that, when executed by a processor, cause the processor to:
- receive said one or more TCP packets by a source proxy located on said wireless link;
- determine, by said source proxy, a simple compression mode packet from said one or more TCP packets by removing the TCP packet header comprised in each TCP packet, said simple compression mode packet comprising the TCP data sections comprised in said one or more TCP packets and a header that comprises a connection identifier;
- send, by said source proxy, the simple compression mode packet to a destination proxy located on said wireless link;
- receive, by said destination proxy, said simple compression mode packet and acknowledging reception of said simple compression mode packet to the source proxy;
- determine, by the destination proxy, one or more reconstructed TCP packets by extracting the data sections of each TCP packet from said simple compression mode packet; and
- send, by the destination proxy, said one or more reconstructed TCP packets to the destination device, wherein said connection identifier identifies a connection between said source proxy and said destination proxy, the header of said simple compression mode packet further comprising:
- a first next field representing a number of the simple compression mode packet sent by the source proxy and being incremented by one each time a simple compression mode packet is sent by the source proxy;
- a second next field representing a number of the simple compression mode packet received by the source proxy from the destination proxy and being incremented by one each time a simple compression mode packet is sent from the destination proxy to the source proxy; and
- a third next field indicating if a connection end is delivered by the source or the destination.

* * * * *